Sept. 28, 1926.

Re. 16,433

L. J. GRUBMAN

EYE MOUNTING FOR DOLLS

Original Filed April 5, 1924

INVENTOR

Leo J. Grubman

BY C. P. Goepel his ATTORNEY

Reissued Sept. 28, 1926. Re. 16,433

UNITED STATES PATENT OFFICE.

LEO J. GRUBMAN, OF BELLE HARBOR, NEW YORK, ASSIGNOR, BY MESNE ASSIGNMENTS, TO GRUBMAN ENGINEERING MANUFACTURING CO. INC., OF LONG ISLAND CITY, NEW YORK, A CORPORATION OF NEW YORK.

EYE MOUNTING FOR DOLLS.

Original No. 1,540,521, dated June 2, 1925, Serial No. 704.410, filed August 5, 1924. Application for reissue filed June 7, 1926. Serial No. 114,366.

This invention relates to eye mountings for dolls and in its broader aspects comprehends the provision of simple and inexpensive means for easily, quickly and accurately mounting the artificial members within a doll head for axial oscillation in spaced eye sockets formed in the head wall.

More particularly, it is the primary object and purpose of my present improvements to provide means for attaching the mounting to the wall of the doll head which includes parts operating to hold the eye members locked against casual shifting movement in spaced relation to each other between the attaching means and the eye sockets until the mounting is properly located and said attaching means engaged with the head wall, whereupon, the eye members are automatically released for receding movement out of contact with the walls of the respective eye sockets.

It is also another important object of the invention to provide certain structural features whereby the spherical surfaces of the individual eye members may be initially positioned in contacting engagement with the walls of the eye sockets, and when the attaching members have been engaged with the wall of the doll head a slight recession of the eye members is permitted whereby they may rock or oscillate freely in the eye sockets without frictional binding contact upon the walls of said sockets.

With the above and other objects in view, the invention consists in the improved eye mounting and in the form, construction and relative arrangement of its several parts as will be hereinafter more fully described, illustrated in the accompanying drawings and subsequently incorporated in the subjoined claims.

In the drawing wherein I have disclosed one simple and satisfactory embodiment of the invention and in which similar reference characters designate corresponding parts throughout the several views.

Figure 4:
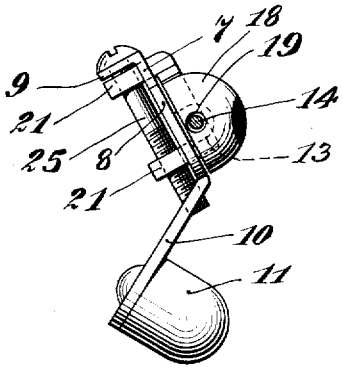
Figure 4 is a side elevation of the mounting.

For the purpose of illustrating the manner of application of my improved eye mounting in the accompanying drawing, I have shown a doll head 5 which may be moulded or otherwise fashioned from wood pulp, papier-mâché, or other suitable composition material. The front wall of this doll head is provided with the usual eye sockets indicated at 6 arranged in appropriate spaced relation to the other molded facial features of the doll head.

The new eye mounting forming the subject matter of the present application includes a frame plate 7 which may be of any suitable form and dimensions, but as herein shown, is provided with oppositely projecting lateral portions 8 and at its upper end between said lateral portions with an angularly disposed flange 9. At their lower sides the lateral portions 8 are integrally connected by a central obliquely extending arm 10 to the extremity of which a suitable weight 11 is fixed in any preferred manner.

Each of the lateral portions 8 of the frame plate is provided with a longitudinally extending slot 12 at the opposite ends of which the lugs 13 project from the front side of said plate. The pairs of lugs thus provided upon each lateral portion 8 of the frame plate are provided with openings to loosely receive the pivot pins 14. Each of these pivot pins at its outer end is sharply pointed as at 15 to provide a bearing adapted for engagement in the wall of the doll head in the manner to be presently described. The other or inner end of each pivot pin is rounded or convex as shown at 16. In spaced relation to each end of the pivot pins there is provided a reduced portion forming an annular channel or groove 17 thereon.

Figure 3:
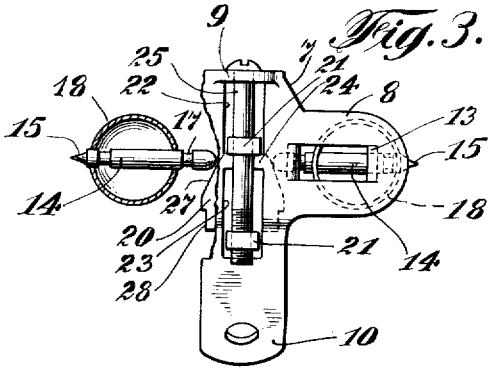
Figure 3 is a rear elevation of the mounting partly broken away and one of the eye members being shown in section.
Figure 1:
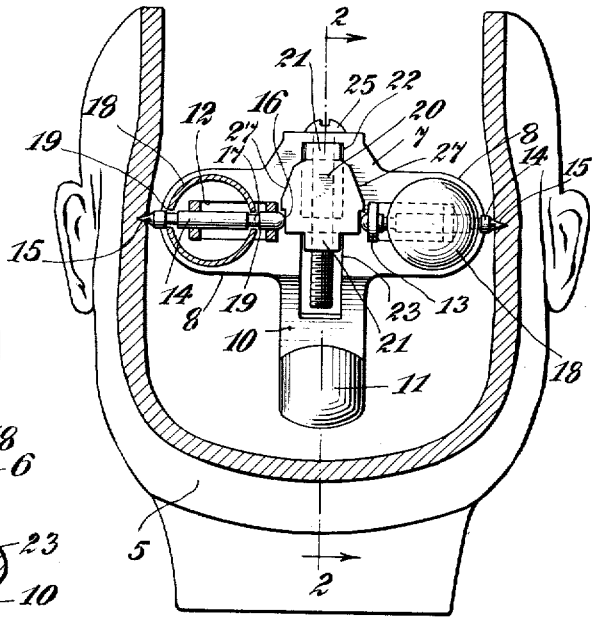
Figure 1 is a sectional view through a doll head taken approximately on the line 1—1 of Figure 2, showing the improved mounting arranged therein and one of the eye membes being illustrated in section.

The individual eye members 18 are in the form of hemi-spherical shells, preferably of celluloid or other suitable material which may be readily die shaped or formed. The shell wall at diametrically opposite points and adjacent to its rear open side is provided with the openings 19 which are of approximately the same dimension as the maximum diameter of the pivot pin 14. In assembling these eye members they are arranged upon the front side of the frame plate as shown in Figure 3 of the drawing, with one side of the shell wall positioned between the spaced lugs 13, while the opposite side of said wall is positioned outwardly of the outermost lug 13. In other words, the outer lug extends within the eye shell while the inner lug is exterior thereof and spaced from the inner side of said shell. The openings 19 in the shell wall being disposed in registering relation with the openings of the lugs 13, the pivot pin 14 is then inserted through said registering openings until the pointed end 15 of the pin projects beyond the outer side of the eye shell, and the parts of said pin of maximum diameter are positioned in the openings 19 in the shell wall as seen at the left hand side of Figure 3 of the drawing.

For the purpose of projecting the pivot pins axially from the position shown in Figure 3 so as to engage their pointed ends 15 in the opposite sides of the head wall I provide an adjustable element 20 arranged upon the front side of the frame plate 7 and having at its upper and lower ends the angularly extending arms 21 positioned respectively through slots 22 and 23 formed in said frame plate. These slots are separated from each other by means of an integral portion or web 24 on the plate 7 which acts as a stop limiting the movement of the element 20. The upper arm 21 on said movable element is provided with an opening in the flange 9 of the plate 7 and loosely receives the adjusting screw 25. The other or lower arm 21 of the element 20 has a threaded opening 26 therein to receive the threads of the screw 25.

The element 20 is provided at its opposite sides with the cam edges 27 which are inclined outwardly and downwardly from the upper arm 21, said element 20 having its greatest width at the lower ends of these cam edges. Immediately below the cam edges said element is reduced in width providing the shoulders 28 thereon.

Assuming that the eye members have been assembled upon the frame plate with the pivot pins 14 as shown in Figure 3 and that the adjustable element 20 is in its lower position, the mounting is arranged within the doll head and the spherical surfaces of the individual eye members 18 are engaged in the respective eye sockets 6 in contact with the circumferential walls thereof. These sockets being milled by hand, it almost invariably results that the relation between the walls of the socket and the edge of the eye opening at the outer surface of the doll head is never the same in any two heads produced from the same material. In the attachment of oscillatory eye mountings by the means and methods heretofore available in the art, it is therefore, inevitable that in most cases, after the eye mounting has been attached, the arcuate path of movement of the surface of the individual eye members will be more or less eccentric with respect to the opening in the head wall so that the eyes will have an unnatural appearance. Also it sometimes occurs that the centers of the spaced eye sockets in the head wall will not be located precisely at the same point with respect to the molded facial features of the head. By means of my present improvements providing for a self centering independent movement of the individual eye members, these unavoidable inaccuracies in the formation of the eye sockets in the head wall are automatically taken care of so that even in such cases a realistic oscillatory movement of the eye members will be obtained.

In the operation of initially locating and then finally fixing the eye mounting as a whole within the head of a doll, the cam part 20 is first arranged in its lowermost position to permit the pins 14 to assume the relation to the respective eye members as shown in Fig. 3 of the drawings, wherein the portions of said pins of the larger diameter are engaged within the openings in the walls of the eye members. This relation of the pins to the eye members establishes a fixed radial relation between said pins and the hemispherical surfaces of said eye members. Thus, it becomes apparent that after the eye mounting is placed within the head and with the surfaces of the eye members engaged against the walls of the respective eye sockets and after the pins have been forced outwardly by the cam part 20 to a sufficient extent to impale the ends of said pins in the opposite walls of the doll head, that before the parts of the pins of larger diameter move entirely out of the openings in the walls of the eye members, a permanent axial relationship between the pins is established in relation with the exact geometric axis of the eye sockets. In the continued outward movement of these pins under the action of the cam part 20, the parts of said pins of smaller diameter, indicated at 17 in the drawings, finally come into alignment with the walls of the eye members, and thus permit said eye members to recede from the walls of the eye sockets out of excessive frictional contact therewith. The eye members may therefore, independently find their own centers of oscillation relative to the walls of the respective eye sockets, although the attaching pins for the eye mounting bear a permanently fixed relation to these sockets.

From the above, it will be seen that the pins 14 subserve three important purposes. First, they constitute a fastening or attaching means for the eye mounting as a whole, secondly, they constitute axes about which said mounting and the eye shells oscillate, and thirdly, said pins are so formed and constructed that they constitute means for first obtaining a proper registration or alignment of the eye shell axis with the geometric axis of the eye sockets, and then permit of a recedent movement of said eye shells with relation to the socket walls. This result may be secured in various embodiments of the illustrated disclosure which consists essentially in the provision of the attaching parts relatively slidable in cooperating relation with an eye supporting member and each having means at one end to impale the wall of the doll head, and each of said parts also having surface portions movable in a plane substantially parallel with the front wall of the doll head which are spaced at relatively different distances from said wall and from the axis of oscillation of the eye supporting member. Thus, when the device is initially arranged in the doll head and the eyes engaged in the sockets, the supporting member and the eye members are locked or held by the attaching parts against a relative inward movement away from the sockets and when said parts are projected and impaled in the wall of the doll head, said surface portions thereof are thereby positioned to automatically effect a relative inward movement between the supporting member and the eye members which permits the eye members to recede out of excessive frictional contact with the edges of the eye sockets or openings. Therefore, although, due to variable mechanical inaccuracies in the structure of different doll heads, it is not feasible to provide fixed seats for the attaching parts in predetermined relation to the eye sockets; by means of my invention this difficulty is overcome, with the assurance of complete freedom of oscillatory movement of the eye members in proper relation to the edges of the respective eye openings.

Further, it is to be noted that when the member 20 reaches the limit of its upward movement so that the cam edges 27 no longer bear upon the ends of the pivot pins, the inner ends of said pins are then opposed to the recessed or shouldered edge portions 28 of the adjustable element, thereby permitting of the expansion of the material of the head wall with which the pointed ends 15 of the pivot pins are engaged so that the material is not unduly compressed and the pointed ends of the pivot pins are loosened in their seats so that they are capable of a free rocking motion therein.

It will be understood of course, that the edges of the eye shells 18 at their rear open sides are closely contiguous to the front surface of the frame plate so that the eye shells may not rock or oscillate upon the pivot pins 14 with respect to the supporting frame.

From the above description, it will be apparent that by means of my improved eye mounting and the means which I provide for positioning and supporting the same within the doll head for oscillating movement, the artificial eyes may be quickly and accurately arranged for proper movement with respect to the walls of the respective eye sockets so as to present a very realistic appearance. Owing to the fact that the pivot pins which support the mounting may be engaged with any part of the doll head wall, and said wall is not equipped with special seats to receive said pins, it is possible to utilize the device even though the eye socket centers may not be in accurate registration with the centers of the eye openings.

Figure 2:
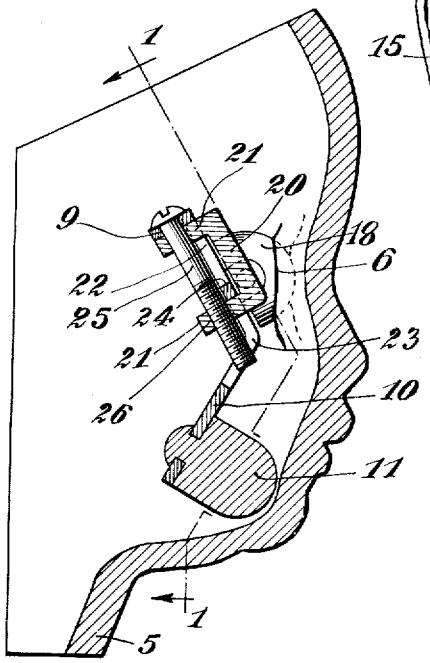
Figure 2 is a vertical sectional view taken on the line 2—2 of Figure 1.

It will be understood of course, that when the device is in the position shown in Figure 2 with the weight member 11 in contact against the front wall of the doll head the artificial eyes are in open position in the sockets and when the doll is moved to a reclining or horizontal position, the weight acts as a pendulum in the usual way to cause an oscillatory movement of the eye mounting so that the individual eye members will oscillate about the axial centers of the pins 14, which, of course, are in exact axial alignment with each other. Consequently in this closing movement of the eyes, the spherical surfaces thereof move in paths which are concentric to the circumferential walls of the respective eye sockets.

From the foregoing description considered in connection with the accompanying drawing, the construction, manner of operation and several advantages of my present disclosure will be clearly understood. The device consists of comparatively few parts which are of very simple form, thereby reducing to a minimum the manufacturing cost of said mounting, while at the same time enabling the eyes to be easily, quickly and properly mounted within the doll head without requiring the exercise of a very high degree of skill upon the part of the workman. I have herein particularly described and illustrated an embodiment of my present improvements which is believed to be entirely practical. However, in so far as I am aware, I believe it to be new in the art to provide a mounting of this character wherein the proper arrangement of the mounting as a whole is first determined by positioning the eye members in contact with the eye socket walls, and said mounting including attaching members adapted to be projected into operative engagement with the wall of the doll head. It is apparent that this fundamental idea might be exemplified by means of various other alternative mechanical structures, and therefore, I reserve the privilege of resorting to all such legitimate changes in the form construction and relative arrangement of the several parts as may be fairly embodied within the spirit and scope of the invention as claimed.

I claim:

1. An eye mounting for dolls including a support, spaced eye members, expansible means on the support extending through the geometrical center of each eye member and movable with respect thereto into bearing engagement with the wall of a doll head to oscillatably sustain the support in definite relation to the eye receiving sockets, and rigid means coacting with said expansible means to unyieldingly retain the latter in operative engagement with the doll head wall.

2. An eye mounting for dolls including a support, spaced eye members carried thereby, independent pivot members for said support extending through the geometrical centers of the respective eye members and axially movable with respect thereto, and additional means movably mounted on the support to coact with said pivot members and axially project the same into operative engagement with the wall of the doll head and thereafter unyieldingly resist axial movement of said members from such operative positions.

3. An eye mounting for dolls including a support, spaced eye members carried thereby, independent pivot members for said support axially coincident with the geometrical centers of the respective eye members and axially movable with respect thereto, and manually shiftable means carried by said support and having fixedly spaced parts coacting with said pivot members to unyieldingly hold the same in operative engagement with the wall of a doll head.

4. An eye mounting for dolls including a support, spaced eye members carried thereby, independent pivot members axially movable upon the support, and an adjustable means carried by said support and having fixedly spaced parts coacting with said pivot members to simultaneously project and unyieldingly hold the same in operative engagement with opposite sides of the wall of a doll head to thereby sustain the support for oscillatory movement.

5. An eye mounting for dolls including a support, spaced eye members carried thereby, independent pivot members axially movable upon the support, and an adjustable cam element mounted upon the support between said pivot members to coact with the latter and operable to simultaneously project said pivot members into operative engagement with opposite sides of the wall of a doll head to sustain the support for oscillatory movement.

6. An eye mounting for dolls including eye members adapted to be engaged in the respective eye sockets of a doll head, independent pivot members extending through the geometrical centers of the respective eye members and axially movable with respect thereto for engagement with the wall of a doll head, each of said pivot members and eye members having coacting means effective when the pivot members are projected into operative engagement with the doll head wall to permit of relative radial movement between the eye members and the pivot members whereby the eye members may independently oscillate about axes not necessarily coincident with the axes of said pivot members, and additional means for rigidly fixing said pivot members against axial movement from their applied positions in the doll head.

7. An eye mounting for dolls including a support, spaced eye members for engagement in the respective eye sockets of the doll head, and a common means for oscillatably sustaining the support in the doll head and positioning the eye members upon said support, said means including independent pivot members extending through the geometrical centers of the eye members and axially movable with respect thereto for engagement with the wall of a doll head to oscillatably sustain the support in definite relation to the eye receiving sockets thereof, and means carried by said support for rigidly fixing the pivot members in the latter positions against relative axial movement.

8. In combination with a doll head having spaced eye sockets, an eye mounting including a support having spaced eye members thereon for engagement in the respective sockets, pivot means mounted on said support for movement with relation to the eye members, and a rigid element on said support coacting with said pivot means to unyieldingly retain the latter in engagement with opposite sides of the head wall and thereby oscillatably sustain the support in position with respect to said eye sockets.

9. In combination with a doll head having spaced eye sockets, an eye mounting including a support having spaced eye members thereon for engagement with the respective sockets, pivot members laterally movable upon the support, and a rigid means manually adjustable relatively to the pivot members after the eye members have been engaged in the eye sockets and slidably coacting with said pivot members to simultaneously move said members in relatively opposite directions into bearing contact with the head wall to oscillatably sustain said support in definite relation to the eye sockets.

10. In combination with a doll head having spaced eye sockets, an eye mounting including a support having spaced eye shells thereon for initial, frictional engagement with the circumferential walls of the respective eye sockets, and means for sustaining said support for oscillatory movement in definite relation to the eye sockets consisting of relatively movable parts mounted upon the support, and means for simultaneously adjusting said parts into bearing engagement with opposite sides of the head wall, each of said parts coacting with one of the eye shells and having means cooperating with the walls of the eye shells when said parts are projected into operative bearing engagement with the head wall to permit of a receding movement of the eye shells with relation to the circmferential walls of the eye sockets.

11. In combination with a doll head having spaced eye sockets, an eye mounting including a support, spaced eye members, spaced axially aligned pivot rods extending in alignment with the geometrical axes of the respective eye members and each movable in the direction of its axis in respect to the eye member, an element operatively mounted upon the support between said pivot rods and having cam portions coacting therewith, and means for moving said element upon the support to simltaneously move said pivot rods into bearing engagement with the wall of the doll head to sustain said support for oscillating movement with respect thereto.

12. In combination with a doll head having spaced eye sockets, an eye mounting including a support, spaced eye members, spaced axially aligned pivot rods extending in alignment with the geometrical axes of the respective eye members and each movable in the direction of its axis in respect to the eye member, an element operatively mounted upon the support between said pivot rods and having cam portions coacting therewith, each of said rods having a pointed outer end constituting a bearing, and means for moving said element upon the support to simultaneously move said rods axially in relatively opposite directions and cause their pointed bearing ends to penetrate the wall of the doll head and sustain said support for oscillatory movement with respect thereto.

13. In combination with a doll head having spaced eye sockets, an eye mounting including a support, spaced eye members, spaced axially aligned pivot rods extending through the geometrical axes of the respective eye members and each movable in the direction of its axis in respect to the eye member, an element slidably mounted upon the support between said pivot rods and having cam portions coacting therewith, each of said rods having a pointed outer end constituting a bearing, and means for shifting said element upon the support to simultaneously move said rods axially in relatively opposite directions and cause their pointed bearing ends to penetrate the wall of the doll head and sustain said support for oscillatory movement with respect thereto, said element at one end of said cam portions being recessed to diminish pressure upon said pivot rods at the end of the camming action.

14. In combination with a roll head having spaced eye sockets, an eye mounting including a support, spaced eye members, spaced axially aligned pivot rods extending in alignment with the geometrical axes of the respective eye members and each movable in the direction of its axis with respect to the eye member, an element operatively mounted upon the support between said pivot rods and having cam portions coacting therewith, each of said rods having a pointed outer end constituting a bearing, and a manually adjustable screw mounted upon the support having threaded connection with said element to move the same and simultaneously move said pivot rods into bearing engagement with the wall of the doll head to sustain said support for oscillatory movement with respect thereto.

15. In combination with a doll head having spaced eye sockets, an eye mounting including a support, spaced eye shells adapted to frictionally engage with the circumferential walls of the eye sockets, axially aligned pivot rods movably mounted upon the support and extending through the eye shells to retain the latter in position on the support, manually adjustable means mounted on the support and coacting with said rods to simultaneously move said rods in relatively opposite directions and engage the rods at one of their ends with the relatively opposite sides of the doll head wall to thereby oscillatably sustain the support for movement with respect thereto, said pivot rods each having reduced portions adapted to register with opposite sides of the respective shell walls when said rods are moved into bearing engagement with the wall of the doll head to thereby relieve frictional pressure of the shell walls against the walls of the eye sockets.

16. In an eye mounting for dolls, a weighty gravity movable support, eye members for engagement in the respective eye sockets of a doll head, and a common means for oscillatably mounting said support within the doll head and positioning the eye members on said support, said means including pivot means extending through the geometrical centers of the respective eye members and axially movable on the support into engagement with the wall of the doll head, said pivot means and the eye members having parts coacting with each other when the pivot means is moved to its applied position to permit of relative movement of the eye members and pivot means radially with respect to the latter, whereby said eye members may independently find centers of oscillation not necessarily coincident with the axis of oscillation of said support.

17. In an eye mounting for dolls, a weighty gravity movable support, eye members for engagement in the respective eye sockets of a doll head, and a common means for oscillatably mounting said support within the doll head and positioning the eye members on said support, said means including pivot means extending through the geometrical centers of the respective eye members and axially movable on the support into applied position with respect to the wall of the doll head, said pivot means and the eye members having parts coacting with each other when the pivot means is moved to its applied position to permit of relative movement of the eye members and pivot means radially with respect to the latter whereby said eye members may independently find centers of oscillation not necessarily coincident with the axis of oscillation of said support, and means carried by said support to coact with said pivot means and rigidly fix the latter in its applied position with respect to the wall of the doll head.

18. In combination with a doll head having eye sockets and eye members adapted to be positioned in the respective sockets and initially engaged with the walls thereof, means for supporting said eye members for oscillating movement in the respective eye sockets including a weighty gravity movable member and pivot means movably mounted on said member and engaged with the eye members for movement with respect thereto into bearing engagement with the wall of a doll head, said pivot means and the eye members having coacting parts operative in the latter position of said pivot means to permit of relative movement between the eye members and the pivot means radially of the pivotal axis whereby the respective eye members may recede from their initial positions and independently assume operative positions in the respective sockets.

19. In combination with a doll head having eye sockets and eye members adapted to be positioned in the respective sockets and initially engaged with the walls thereof, gravity controlled means for transmitting oscillatory movement to said eye members, including a weighted support, and a common means for oscillatably sustaining said support within the doll head and positioning said eye members relative to the support and the walls of the eye sockets, said means comprising independent pivot members axially movable on the support to their applied positions with respect to the doll head wall, said pivot members and the eye members having parts coacting when the pivot members are moved to their applied positions to permit of independent movement of the eye members relative to the support radially of said pivot members, whereby said eye members may find independent centers of oscillation.

20. In combination with a doll head having eye sockets and eye members adapted to be positioned in the respective sockets and initially engaged with the walls thereof, gravity controlled means for transmitting oscillatory movement to said eye members, including a weighted support, and a common means for oscillatably sustaining said support within the doll head and positioning said eye members relative to the support and the walls of the eye sockets, said means comprising independent pivot members axially movable on the support to their applied positions with respect to the doll head wall, said pivot members and the eye members having parts coacting when the pivot members are moved to their applied positions to oscillatively sustain the support in the doll head while permitting of independent movement of the eye members relative to the support radially of said pivot members, whereby said eye members may find independent centers of oscillation, and means movably mounted on said support adapted to be interposed between the pivot members to unyieldingly resist relative axial movement of said members from their applied positions with relation to the doll head.

21. In an eye mounting for dolls, a support having spaced parts to be opposed to the eye openings in the wall of a doll head, eye members mounted upon said spaced parts of the support adapted to be positioned in the eye openings, and movable means mounted on the support co-operating with the eye members to hold said eye members and the support in assembled relation, said means adapted for movement on the support with respect to the eye members into engagement with the wall of the doll head to oscillatably sustain the support in definite relation to the eye openings thereof, and means on said support to coact with said movable means and unyieldingly hold the latter in operative engagement with the wall of the doll head.

22. In an eye mounting for doll heads, spaced eye members adapted to be positioned in eye receiving openings of the doll head, pivot members associated with the respective eye members and in axial alignment with each other, said pivot members adapted for relative axial movement with respect to the eye members into engagement with the opposite sides of a doll head wall, and a rigid element adapted to be interposed between the spaced pivot members and coacting therewith to retain the latter unyieldingly against relative axial movement in engagement with the wall of the doll head.

23. In combination with a doll head having eye receiving openings, eye members positioned in the respective openings, independent pivot members associated with the respective eye members in coinciding relation with the geometrical axes thereof and in axial alignment with each other, said pivot members adapted for relative axial movement with respect to the eye members into applied engagement with the opposite sides of the doll head wall, a rigid element adapted to be interposed between the spaced pivot members to coact therewith and rigidly hold said members against axial movement from their applied positions, and an eccentrically weighted member suspended by said pivot members for oscillatory movement and having spaced portions cooperating with the respective eye members to transmit oscillatory movement to the latter.

24. In an eye mounting for dolls, eye ball members, spaced pivot members located coincident with the axes of the respective ball members, and movable relative thereto into engagement with opposite sides of a doll head wall to support the eye members for oscillatory movement, and a part adapted to co-act with the pivot members to unyieldingly resist movement of the same from their applied positions with respect to the doll head wall.

25. In combination with a doll's head, having eye openings in its wall, eye ball members within said openings, spaced pivot members located coincident with the axes of the respective eye ball members and movable relative thereto into engagement with opposite sides of the doll head wall, to support the eye members for oscillatory movement, and gravity controlled means for oscillating said eye members having a part movable therewith and co-acting with said pivot members to unyieldingly resist axial movement of said pivot members from their applied positions with respect to the doll head wall.

26. In an eye mounting for dolls, eye members adapted to be positioned in spaced openings of a doll head wall, an oscillatory member for transmitting oscillating movement to the eye members, and attaching means for the eye mounting having relatively movable parts supporting the oscillatory member and including means with which said parts cooperate in one position thereof to hold the eye members against movement relative to the attaching means while the eye members are engaged with the edges of the openings in the doll head wall, and said movable parts having means which, when said parts are operatively engaged with the doll head wall, permits of a self centering movement of the eye members independently of the attaching means and in relation to the walls of the respective eye openings.

27. In an eye mounting for dolls, eye members adapted to be positioned in spaced openings in a doll head wall, an oscillatory member for transmitting motion to said eye members, and attaching means for suspending said oscillatory member within the doll head including parts operatively connected with the eye members and movable relative to said oscillatory member, said parts in one position thereof and before application of the attaching means to the doll head wall holding the eye members against casual relative movement with respect to the attaching means and said parts each having means which in another position thereof, after the attaching means is applied to the doll head wall, releases the eye members for free movement out of excessive frictional contact with the walls of the eye openings.

28. In an eye mounting for dolls, eye members adapted to be positioned in spaced openings in a doll head wall, an oscillatory member for transmitting motion to said eye members, and attaching means for suspending said oscillatory member within the doll head, said means consisting of relatively movable parts operatively connected with the oscillatory member and the eye members and each having means to hold the eye-members in spaced substantially fixed positions relative to the oscillatory member in one position of said parts, and each of said parts having additional means engageable with opposite sides of the doll head wall upon a relative movement of said parts to permanently fix the location of the eye mounting in the doll head, and said parts each having means, which, in the latter positions thereof permits movement of the individual eye members in the respective eye openings with relation to said attaching means.

29. In an eye mounting for dolls, eye members adapted to be positioned in spaced openings in a doll head wall, an oscillatory member for transmitting motion to said eye members, and attaching means for suspending said oscillatory member within the doll head, said means consisting of relatively movable parts operatively connected with the oscillatory member and the eye members and each having means to hold the eye members in spaced substantially fixed positions relative to the oscillatory member in one position of said parts, and each of said parts having additional means engageable with opposite sides of the doll head wall upon a relative movement of said parts to permanently fix the location of the eye mounting in the doll head, and said parts each having means, which, in the latter positions thereof permits movement of the individual eye members in the respective eye openings with relation to said attaching means, and means for locking said attaching means against relative movement from their applied positions.

30. In an eye mounting for dolls, eye members adapted to be positioned in spaced openings of a doll head wall, an oscillatory member for transmitting oscillating movement to the eye members, and attaching means for the eye mounting having parts movably engaged with the oscillatory member and operating in one position thereof to hold the eye members in spaced relation against casual relative movement while the eye members are being located in the openings of the doll head wall, and said movable parts each having means, which, when the attaching means is operatively engaged with the doll head wall to suspend the mounting therein, thereafter permits of a self centering movement of the eye members with respect to the attaching means and in relation to the walls of the respective eye openings.

31. In supporting and attaching means for oscillating eye mountings for doll's heads, an eye supporting member relatively movable attaching parts cooperatively associated with said member to sustain the same in operative position, said parts each having means adapted to be forcibly impaled under pressure in the doll head wall to sustain the mounting in applied position, and means associated with said parts unyielding in the direction of movement of said parts to resist movement of said parts out of engagement with the wall of the doll head.

32. In supporting and attaching means for oscillatory eye mountings for doll heads, a supporting member having guides thereon, a pair of attaching parts relatively movable in said guides and adapted to be manually moved with relation to said member and each having means at one end to be impaled in opposite sides of the doll head wall, and locking means on the supporting member for said attaching parts cooperating therewith to positively hold said parts against casual receding movement out of operative engagement with the wall of the doll head.

33. In supporting and attaching means for oscillatory eyes for dolls, a supporting member, relatively movable attaching parts carried by said member and adapted to be moved with respect thereto into engagement with opposite walls of the doll head to sustain said member in its applied position, and independently operable means adapted to be engaged with said attaching parts to move the same to their applied positions.

34. In supporting and attaching means for oscillatory eyes for dolls, a supporting member, relatively movable attaching parts carried by said member and adapted to be moved with respect thereto into engagement with opposite walls of the doll head to sustain said member in its applied position, and means for actuating said attaching parts, and said means including means cooperating with said attaching parts to lock the same against movement from their applied positions with respect to the doll head wall.

35. Means for attaching an oscillatory eye support to a doll's head comprising relatively slidable attaching members and means for cooperatively assembling said members with the support, each of said members having surface portions movable in a plane substantially parallel with the front wall of the doll head and spaced at relatively different distances therefrom when said support and the attaching means are arranged in a doll's head to hold the eyes in frictional engagement with the walls of the eye sockets in the doll head, said members adapted to be slidably projected in opposite directions to applied positions in engagement with the doll head wall and simultaneously position said surface portions thereof to permit of a recedent movement of the eyes away from the walls of the eye sockets.

36. Means for attaching an oscillatory eye support to a doll's head comprising relatively slidable attaching members and guiding means therefor cooperatively assembled with the eye support to sustain the latter for oscillatory movement, said members having surface portions spaced at relatively different distances from the axis of oscillation of the eye support and positioned with respect to said support in substantially parallel relation to the front wall of the doll head when said support and the attaching means are initially arranged in the doll's head to substantially lock the eyes in frictional contact with the walls of eye sockets in the doll head and against inward movement with respect thereto, said members adapted to be slidably projected in opposite directions to applied positions in engagement with the wall of the doll head and simultaneously position said surface portions thereof to release the eyes and permit of a recedent movement of the eyes away from the walls of the eye sockets.

In testimony that I claim the foregoing as my invention I have signed my name thereto.

LEO J. GRUBMAN.

Certificate of Correction.

It is hereby certified that the name of the assignee in Reissue Letters Patent No. 16,433, granted September 28, 1926, upon the application of Leo J. Grubman, of Belle Harbor, New York, for an improvement in "Eye Mountings for Dolls," was erroneously described and specified as "Grubman Engineering Manufacturing Co. Inc.," whereas said name should have been described and specified as *Grubman Engineering & Manufacturing Co., Inc.*, as shown by the records of assignments in this office; and that the said Letters Patent should be read with this correction therein that the same may conform to the record of the case in the Patent Office.

Signed and sealed this 19th day of October, A. D. 1926.

[SEAL.]

WM. A. KINNAN,
*Acting Commissioner of Patents.*